A. J. Chase.
Watch-Key Protector.

N° 73077.   Patented Jan. 7, 1868.

Witnesses
C. M. Baldwin
Edward Griffith

Inventor
A. J. Chase
by his Attorney
Frederick Curtis

United States Patent Office.

A. J. CHASE, OF BOSTON, MASSACHUSETTS.

Letters Patent No. 73,077, dated January 7, 1868.

---

IMPROVEMENT IN WATCH-KEY PROTECTORS.

---

The Schedule referred to in these Letters Patent and making part of the same.

---

TO ALL TO WHOM THESE PRESENTS SHALL COME:

Be it known that I, A. J. CHASE, of Boston, in the county of Suffolk, and State of Massachusetts, have invented a new and useful Watch-Key Protector; and do hereby declare the following to be a full, clear, and exact description of the same, due reference being had to the accompanying drawings, making part of this specification, and in which—

Figure 1:
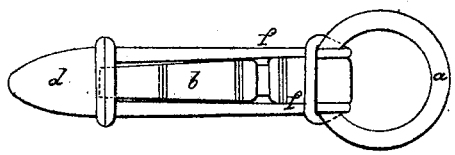

Figure 1 is an elevation, and

Figure 2:
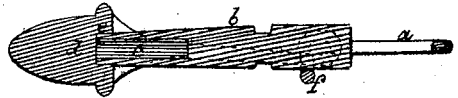

Figure 2 a longitudinal section of a watch-key provided with my invention.

Figure 3:
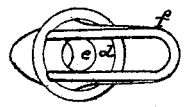

Figure 3 is a representation of my invention as detached from the key.

The object of this invention is to provide a perfect protection for the mouth of a watch-key, against entrance of dirt to its winding-chamber, the invention being applicable to watch-keys of any construction, and being extremely simple and cheap of manufacture.

The invention consists in a conical-shaped block of vulcanized India rubber, or other analogous material, having a loop formed upon its base for attachment to the key, the said base being recessed for reception of the winding-end of the key, essentially as hereinafter shown and explained.

In the accompanying drawings, which illustrate my invention, $a$ denotes the handle, and $b$ the shank or stem of an ordinary watch-key, the chamber in the end of such shank, for reception of the arbor of the watch, being shown at $c$. The elastic guard is composed of a conical or other proper-shaped bulb or block, $d$, having a shallow recess or indentation, $e$, made in its base, for reception of the end of the shank $b$ of the watch-key, and to keep the guard in its due relation with the key. A loop, $f$, is formed upon the base of the bulb $d$, and makes part of it, the end of such loop, when the device is applied to a key, being secured to the head or handle of such key by a "half-hitch," or any suitable knot which will retain it in place. The length of this elastic loop being considerably less than that of the shank of the key, its elastic properties will draw the bulb $d$ tightly up to and close the mouth of the chamber $c$, thus effectually preventing entrance of dirt or any substance to such chamber, at same time permitting such chamber to be easily uncovered.

The invention is intended chiefly for application to a watch-key, although it may be applied, with benefit, in different forms, to any species of key.

My invention, when applied to a key, prevents, to a considerable extent, the wear upon a person's pocket by the point of such key. The elastic bulb further answers the useful purpose of an eraser, for obliterating pencil-marks.

The simplicity and cheapness of construction of the invention enable it, as before observed, to be sold at very small cost.

I claim a vulcanized India-rubber key-guard, consisting of the bulb $d$ and loop $f$, made substantially as and for the purposes herein shown and set forth.

A. J. CHASE.

Witnesses:
FREDERICK CURTIS,
EDWARD GRIFFITH.